(12) United States Patent
Takeda et al.

(10) Patent No.: US 6,691,729 B2
(45) Date of Patent: Feb. 17, 2004

(54) VALVE ASSEMBLY

(75) Inventors: Masaru Takeda, Amagasaki (JP); Mitsunori Sakai, Amagasaki (JP); Junichi Ono, Fujisawa (JP); Yorikazu Satoh, Fujisawa (JP); Ken Nagasawa, Fujisawa (JP)

(73) Assignees: Kabushiki Kaisha Neriki (JP); Nichiden Kogyo Co., Ltd. (JP)

( * ) Notice: Subject to any disclaimer, the term of this patent is extended or adjusted under 35 U.S.C. 154(b) by 140 days.

(21) Appl. No.: 09/971,603

(22) Filed: Oct. 9, 2001

(65) Prior Publication Data

US 2002/0040729 A1 Apr. 11, 2002

(30) Foreign Application Priority Data

Oct. 6, 2000 (JP) ...................................... P2000-306916

(51) Int. Cl.[7] .............................................. F16K 17/38
(52) U.S. Cl. ...................... 137/74; 62/50.7; 137/601.14; 137/601.21; 137/613; 222/3
(58) Field of Search ................................ 137/74, 601.2, 137/601.21, 601.14, 613, 614, 861, 886; 62/50.7; 141/285, 310; 222/3, 6

(56) References Cited

U.S. PATENT DOCUMENTS

| 2,047,339 A | * | 7/1936 | Thomas ........................ 222/3 |
| 2,246,458 A | * | 6/1941 | MacSporran .................... 222/3 |
| 2,307,309 A | * | 1/1943 | Thomas ........................ 222/3 |
| 2,566,372 A | * | 9/1951 | Ray ....................... 137/601.14 |
| 4,520,838 A | * | 6/1985 | Fisher et al. ................... 222/3 |
| 5,195,558 A | * | 3/1993 | Liang ..................... 137/601.14 |
| 5,197,710 A | * | 3/1993 | Wass et al. ..................... 222/3 |
| 5,309,945 A | * | 5/1994 | Sakai et al. ................. 137/861 |
| 5,452,738 A | * | 9/1995 | Borland et al. ............. 137/613 |
| 5,529,089 A | * | 6/1996 | Hicks et al. .................... 222/3 |
| 5,562,117 A | * | 10/1996 | Borland et al. ................ 137/74 |
| 5,738,145 A | * | 4/1998 | Daicho et al. .................. 222/3 |

FOREIGN PATENT DOCUMENTS

JP          2945984          7/1999

* cited by examiner

Primary Examiner—Stephen M. Hepperle
(74) Attorney, Agent, or Firm—Bacon & Thomas, PLLC

(57) ABSTRACT

A housing (16) comprises a first housing (17) and a second housing (18). The first housing (17) is fixed to a gas cylinder (1) and is provided with a cylinder main valve (3) which is manually opened and closed. The second housing (18) is provided with a main stop valve (4) of an electromagnetically opening and closing valve. The second housing (18) is removably fixed to the first housing (17) by a tightening bolt (39). In this state where the second housing (18) is fixed to the first housing (17), the cylinder main valve (3) has a first valve chamber (44) communicated with a second valve chamber (63) of the main stop valve (4).

8 Claims, 13 Drawing Sheets

VALVE ASSEMBLY

BACKGROUND OF THE INVENTION

1. Field of the Invention

The present invention relates to a valve assembly which is attached to a fuel gas storing cylinder or the like of an engine using compressed natural gas or liquefied petroleum gas as a fuel.

2. Explanation of Related Art

Japanese Patent No. 2,945,984 discloses a conventional example of the valve assembly which is employed for a fuel supply device of an engine using liquefied petroleum gas (LPG) or compressed natural gas (CNG) as a fuel. This conventional example comprises a cylinder valve attached to a gas cylinder. The cylinder valve and an engine are connected to each other through a fuel supply passage. The fuel supply passage has a mid portion provided with an electromagnetically opening and closing valve. The cylinder valve is manually opened and closed. The electromagnetically opening and closing valve is interlockingly connected to a key switch of the engine for opening and closing.

The conventional technique connects the cylinder valve to the electromagnetically opening and closing valve through a pipe line of the fuel supply passage. This entails a problem that it should be still improved on the following points.

The valve assembly must be connected to the pipe line at many portions and therefore the piping work is too troublesome to be effected inexpensively. Besides, it increases portions to be inspected as regards the airtightness, gas conductivity and the like with the result of making the maintenance work troublesome.

Although it can be considered to incorporate the electromagnetically opening and closing valve into a housing of the cylinder valve, a long non-use requires to manually close it with assuredness. When the cylinder valve comprising a manually opening and closing valve and the electromagnetically opening and closing valve are incorporated into one housing, the structure becomes so complicated that it cannot be put into practice at a low cost. In addition, as for the valve assembly used for the engine fuel supply device of this type, a high reliability is required. However, it is not easy to maintain at a high level of quality both of the manually opening and closing valve and the electromagnetically opening and closing valve incorporated into one housing. Further, in the case where the electromagnetically opening and closing valve has a defect, there is a problem that the maintenance costs high since the whole valve assembly must be replaced or the like.

SUMMARY OF THE INVENTION

The present invention aims at making it possible to effect an inexpensive piping, to enhance the reliability and to perform the maintenance easily.

In order to accomplish the above aim, the present invention has constructed a valve assembly in the following manner, for example, as shown in FIGS. 1 to 13.

A housing 16 comprises a first housing 17 and a second housing 18. The first housing 17 is fixed to a gas cylinder 1. The first housing 17 is formed with a gas inlet 20 to be communicated with an interior space 19 of the gas cylinder 1, a gas inlet passage 23, a first opening and closing valve 3, a first communication passage 24, and a communication outlet 25. The first opening and closing valve 3 is provided with a first valve seat 45 and a first valve chamber 44, into which a first closure member 46 is inserted. An actuation means 42 is interlockingly connected to the first closure member 46 through a transmission member 47. The actuation means 42 is manually operated so as to actuate the first closure member 46 for opening and closing with respect to the first valve seat 45.

On the other hand, the second housing 18 is formed with a communication inlet 29, a second communication passage 30, a second opening and closing valve 4, a gas outlet passage 31 and a gas outlet 32. The second opening and closing valve 4 is provided with a second valve seat 64, a valve closing spring 68, an electromagnetic device 43 and a second chamber 63, into which a second closure member 66 is inserted. The second closure member 66 is pushed to the second valve set 64 by a resilient force of the valve closing spring 68 and is moved in a valve-opening direction by energizing the electromagnetic device 43.

The second housing 18 is removably fixed to the first housing 17 through a fixing means 39. When the former is fixed to the latter, the communication inlet 29 communicates with the communication outlet 25.

The present invention functions as follows.

The first opening and closing valve 3 as well as the second opening and closing valve 4 is subjected to an inspection for its performance and quality independently before the second housing is assembled to the first housing 18. Then both of the housing 17 and 18 respectively provided with the opening and closing valves 3 and 4, each of which has a reliability high enough to have passed the inspection, are assembled to each other through the fixing means 39 into a valve assembly 2. In a state where the second housing 18 is fixed to the first housing 17, the first housing 17 has the communication outlet 25 mutually communicated with the communication inlet 29 of the second housing 18. Therefore, for example, as shown in FIG. 2, a fuel supply passage 5 to an engine 8 can have its piping completed only if it is connected to the gas outlet 32 of the second housing 18.

In the event that the second opening and closing valve 4 of the electromagnetically opening and closing valve undergoes maintenance or is replaced, the fixing means 39 is cancelled from fixing operation while closing the first opening and closing valve 3 of the first housing 17 fixed to the gas cylinder 1 to thereby remove the second housing 18 from the first housing 17.

The present invention offers the following advantages since it is constructed and functions as mentioned above:

(1) it is sufficient if the fuel supply device to the engine is connected to the gas outlet of the second housing. This reduces the portions to be connected for piping with the result of being able to effect the piping simply and inexpensively, to facilitate the inspection work for the gas leakage and the like and besides to enhance the reliability of the piping;

(2) The first opening and closing valve as well as the second opening and closing valve can be readily subjected to an inspection for its performance and quality independently before the second housing is assembled to the first housing. This can enhance the quality and reliability of whole the valve assembly; and (3) The second housing can be readily removed from the first housing only by closing the first opening and closing valve with the first housing fixed to the gas cylinder and cancelling the fixing operation of the fixing means. This makes it possible to easily repair and replace the second opening and closing valve provided in the second housing when the second opening and closing valve of the electromagnetically opening and closing valve experiences a misoperation or disorder, which results in an easy maintenance of the valve assembly.

The present invention includes the following valve assembly.

As for the fixing means 39, concretely speaking, a tightening bolt can be employed. However, the fixing means 39 is sufficient if it can removably fix the second housing 18 to the first housing 17 and therefore may employ other fixing means.

The second housing 18 can be brought into direct contact with the first housing 17 for fixing, for example, as shown in FIG. 5, 8, 10 or 12. This case is more preferable because whole the valve assembly can be formed compact and there are fewer portions which need to be connected between mutual gas flow passages within the housing. Further, the second housing 18, for example, as shown in FIG. 13, may be fixed to the first housing 17 through a spacer block 78 or the like. In this case, the spacer block 78 and the like has an interior area formed with a gas passage 79, through which the communication outlet 25 communicates with the communication inlet 29 mutually.

Generally, the electromagnetic device 43 produces heat when energized. Then the first housing 17 is provided with a safety valve 27. This safety valve 27 is formed with a discharge hole 50 which is closed by a fusible alloy 51. In this case, in order for the fusible alloy 51 to hardly suffer from an adverse effect caused by the energizing, for example, as shown in FIG. 10 or FIG. 12, the second housing 18 is preferably fixed to the first housing 17 with the electromagnetic device 43 arranged remote from the safety valve 27.

For instance, as shown in FIG. 2, 6, 11 or 13, it is possible to arrange a bypass passage 33 which communicates the second communication passage 30 with the gas outlet 32, in parallel with the second opening and closing valve 4 and to provide in the bypass passage 33 a third opening and closing valve 34 which is manually opened and closed. In this case, the airtightness test or the gas conductivity test can be easily carried on the piping by opening the third opening and closing valve 34 without energizing the electromagnetic device 43 and therefore with the second opening and closing valve 4 closed.

For example, as shown in FIG. 2, 6, 11 or 13, the housing 16 is provided with a gas charging port 10. Arranged in parallel with the second opening and closing valve 4 is a gas charging passage 35 which communicates the gas charging port 10 with the interior space 19 of the gas cylinder 1. A check valve 11 is disposed in the gas charging passage 35 so as to inhibit the gas flow from the interior space 19 to the gas charging port 10. In this case, gas can be readily charged into the gas cylinder 1 without opening the second opening and closing valve 4 but by connecting a gas charging device to the gas charging port 10 directly or through a gas charging pipe 13.

Further, as shown in FIG. 11, the gas charging port 10 may also serve as the gas outlet 32. In this case, the gas charging passage 35 branches from a mid portion of the gas outlet passage 31. According to this structure, only one pipe play roles of the fuel supply passage 5 to the engine 8 and the gas charging pipe 13 with the result of simplifying the piping structure.

In the event that the housing 16 is provided with the gas charging port 10, a first filter 21 is arranged between the gas inlet 20 and the second opening and closing valve 4. The second valve chamber 63 communicates with the interior space 19 of the gas cylinder 1 through the first filter 21. Disposed between the gas charging port 10 and the check valve 11 is a second filter 36, through which the gas charging port 10 can communicate with the interior space 19 of the cylinder 1. According to this construction, the first filter 21 can get rid of dust and the like foreign matters produced within the gas cylinder 1 and the second filter 36 removes the foreign matters contained in the charged gas. This can prevent the clogging of orifices and so on in the valve assembly 2 and the attaching of foreign matters to the valve seats and the like with the result of maintaining the reliability on the valve assembly high over a prolonged period of time.

For instance, as shown in FIGS. 6 to 8, the housing 16 is provided with a gas cylinder connection port 73. And it is possible to arrange in parallel with the second opening and closing valve 4 a gas branching passage 74 which communicates the gas cylinder connection port 73 with an interspace between the first valve seat 45 and the second valve seat 64. According to this construction, for example, as shown in FIG. 6, a gas outlet 83 of a valve assembly 82 attached to another gas cylinder 81 communicates with the gas cylinder connection port 73 through a gas communication pipe 75, thereby connecting a plurality of gas cylinders to one another. Gas within the another gas cylinder 81 is taken out of the gas outlet 32 through the gas cylinder connection port 73, the gas branching passage 74, and the second opening and closing valve 4.

At this time, as mentioned above, in the event that the housing 16 is provided with the gas charging port 10 and the gas charging passage 35, gas is charged from the gas charging passage 35 into the another gas cylinder 81 through the gas branching passage 74, the gas cylinder connection port 73 and the gas communication pipe 75. Thus a plurality of gas cylinders can be easily connected to one another without using any piping structure which has many portions to be connected, like a branched pipe or a cheese joint. Besides, since the gas within the another gas cylinder 81 is taken out of the gas outlet 32 via the second opening and closing valve 4, any electromagnetically opening and closing valve need not be provided in the valve assembly 82 of the another gas cylinder 81. Additionally, when gas is charged into the another gas cylinder 81, the abovementioned connecting structure can be used to result in an easy arrangement of the gas charging pipe 13.

Moreover, for example, as shown in FIGS. 11 and 12, it is possible to provide the gas cylinder connection port 73 in the first housing 17 and to arrange in parallel with the second opening and closing valve 4, the gas branching passage 74 which communicates the gas cylinder connection port 73 with the first valve chamber 44.

DESCRIPTION OF THE PREFERRED EMBODIMENTS

Hereafter, explanation is given for embodiments of the present invention based on the drawings.

(First Embodiment)

Figure 1:
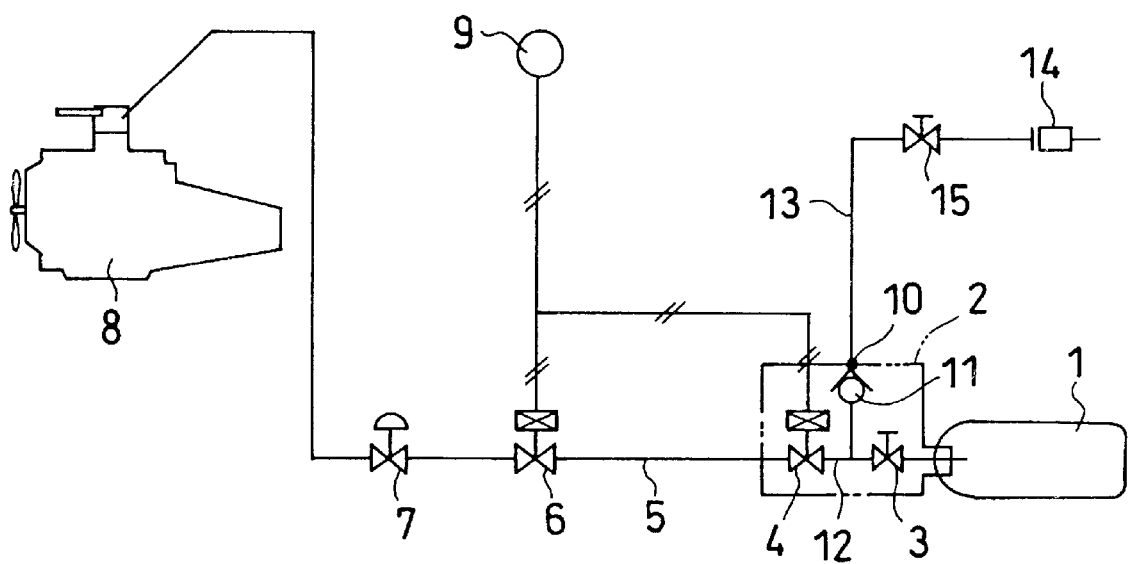
FIG. 1 is a schematic structural view of a fuel supply device, which employs a valve assembly of the present invention, of an engine using compressed natural gas as a fuel.
Figure 2:
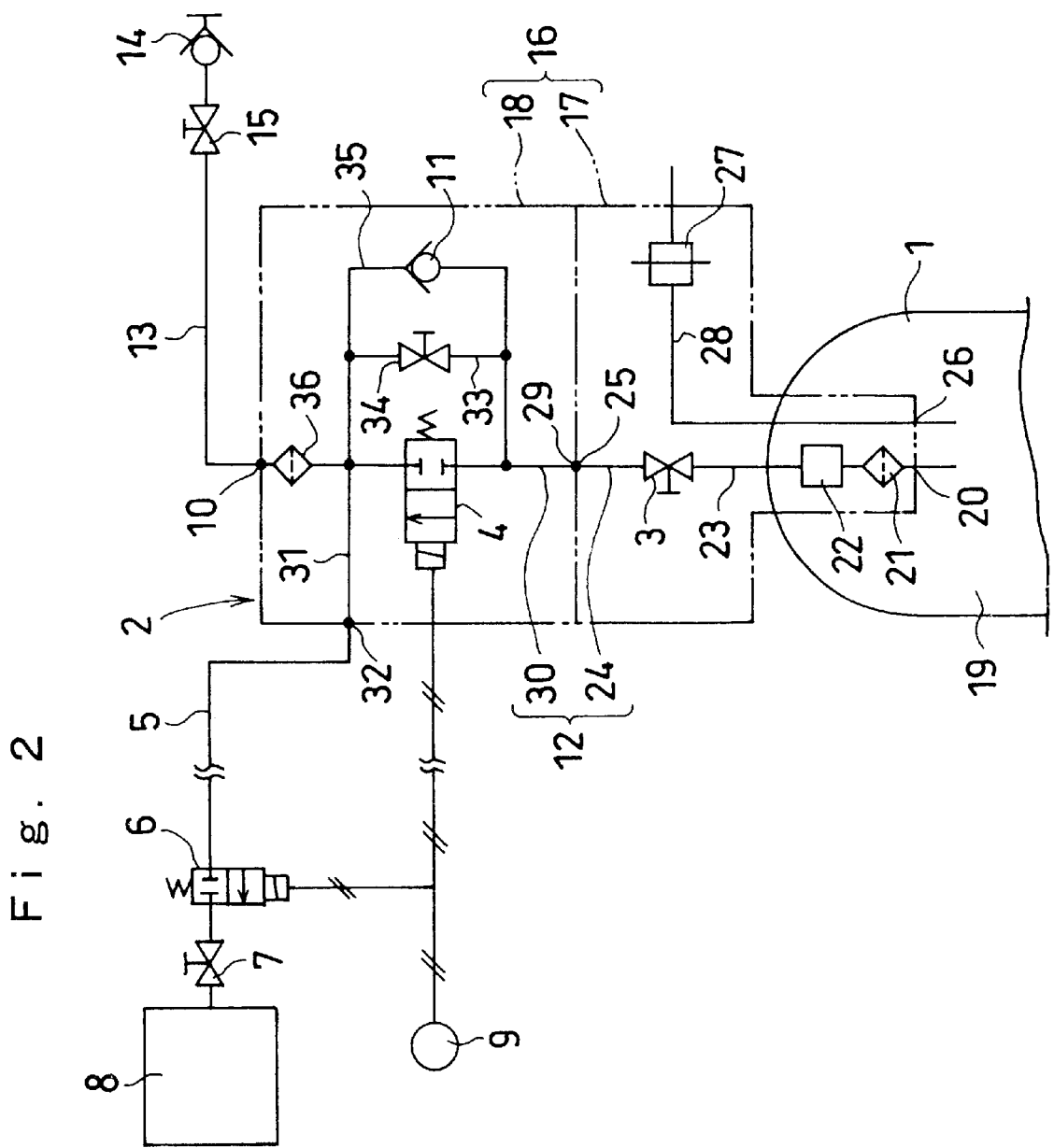
FIG. 2 shows a first embodiment of the present invention and is a system view of a valve assembly.

First, an outlined structure of a valve assembly is explained by relying on FIGS. 1 and 2.

As shown in FIG. 1, a valve assembly 2 of the present invention is fixed to a gas cylinder 1. Incorporated into the valve assembly 2 are a cylinder main valve 3 of a first opening and closing valve and a main stop valve 4 of a second opening and closing valve.

A fuel supply passage 5 has one end connected to the valve assembly 2 and has the other end connected to an engine 8 via a fuel shut-off valve 6 and a pressure reduction valve 7 in the mentioned order. The cylinder main valve 3 comprises a manually opening and closing valve. Each of the main stop valve 4 and the fuel shut-off valve 6 comprises an electromagnetically opening and closing valve. In a state where the cylinder main valve 3 is opened, when an engine switch 9 is put on to open the main stop valve 4 and the fuel shut-off valve 6, fuel gas is taken out of the gas cylinder 1 and is supplied to the engine 8.

The valve assembly 2 is provided with a gas charging port 10. The gas charging port 10 is communicated with and connected to an interior area of the gas cylinder 1 through a check valve 11 and via a communication passage 12 between the cylinder main valve 3 and the main stop valve 4.

A gas charging pipe 13 has one end connected to the gas charging port 10 and has the other end provided with a charging device connector 14 which comprises a quick coupler. The gas charging pipe 13 has a mid portion provided with a gas charging valve 15. When charging gas, a gas charging device (not shown) is connected to the charging device connector 14 and the gas charging valve 15 is operated for opening to thereby charge a predetermined amount of fuel gas into the gas cylinder 1.

In this embodiment, the drawings show the valve assembly 2 of one gas cylinder 1 is connected to the fuel supply passage 5. Needless to say, the respective valve assemblies attached to the gas cylinders may be connected to the fuel supply passage 5 in parallel therewith.

As shown in FIG. 2, the valve assembly 2 has a housing 16 which comprises a first housing 17 fixed to the gas cylinder 1 and a second housing 18 removably fixed to the first housing 17.

The first housing 17 has an interior area provided with the cylinder main valve 3. A gas inlet 20 opens toward an interior space 19 of the gas cylinder 1. The gas inlet 20 communicates with a communication outlet 25 through a first filter 21, an excess flow check valve 22, a gas inlet passage 23, the cylinder main valve 3 and a first communication passage 24.

Although the first filter 21 is sufficient if it is arranged between the gas inlet 20 and the main stop valve 4 to be mentioned later, as it is arranged nearer the gas inlet 20 like this embodiment, it is more preferable in view of preventing foreign matters from entering the valve assembly 2. On the other hand, if the first filter 21 is provided between the cylinder main valve 3 and the main stop valve 4 to be mentioned later, there is produced an advantage that the first filter 21 can be easily replaced.

The first housing 17 has an interior area formed with a gas lead-out passage 28 which communicates a safety valve 27 with a gas lead-out outlet 26 opened into the gas cylinder 1. As for the safety valve 27 of the valve assembly 2, it is considered to employ those of rupture disk type, spring type and the like. However, when taking into consideration the safety at the time of vehicle fire or the like accidents, it is preferable to use a safety valve of the type that employs a fusible plug to be mentioned later.

The second housing 18 has an interior area provided with the main stop valve 4 of an electromagnetically opening and closing valve. A communication inlet 29 communicates with a gas outlet 32 through a second communication passage 30, the main stop valve 4 and a gas outlet passage 31. The communication inlet 29 is communicated with and connected to the communication outlet 25 while directly opposing to each other. The fuel supply passage 5 has one end connected to the gas outlet 32.

The second communication passage 30 and the first communication passage 24 form a communication passage 12 which is arranged between the cylinder main valve 3 and the main stop valve 4.

Within the second housing 18, a bypass passage 33 is provided in parallel with the main stop valve 4. The bypass passage 33 has a mid portion provided with a third opening and closing valve 34 which is manually operated for opening and closing. More specifically, the bypass passage 33 has one end and the other end communicated with and connected to a mid portion of the second communication passage 30 and a mid portion of the gas outlet passage 31, respectively. When the third opening and closing valve 34 is opened, the communication inlet 29 communicates with the gas outlet 32.

The second housing 18 has an outer surface formed with the gas charging port 10, to which one end of the gas charging pipe 13 is connected as mentioned above.

Within the second housing 18, a gas charging passage 35 which communicates the gas charging port 10 with the interior space 19 of the gas cylinder 1 is provided in parallel with the main stop valve 4. More specifically, the gas charging passage 35 has one end connected to the gas charging port 10 and the other end connected to the second communication passage 30. When the cylinder main valve 3 is opened, the gas charging port 10 communicates with the interior space 19 of the gas cylinder 1 via the gas charging passage 35, the second communication passage 30, the first communication passage 24, the cylinder main valve 3, the gas inlet passage 23 and the gas inlet 20 in the mentioned order.

The gas charging passage 35 is provided with the check valve 11 which inhibits gas flow from the interior space 19 of the gas cylinder 1 to the gas charging port 10. A second filter 36 is arranged in the gas charging passage 35 between the check valve 11 and the gas charging port 10. The second filter 36 is satisfactory if it is provided between the check valve 11 and the gas charging port 10. But, preferably, it is disposed near the gas charging port 10.

Although the gas charging port 10 is provided in the second housing 18 according to this embodiment, it may be provided in the first housing 17. Further, the gas charging passage 35 has the other end connected to the second communication passage 30. However, it may be connected to the first communication passage 24 or the gas inlet passage 23. Alternatively, it may directly communicate with the interior space 19 of the gas cylinder 1.

Figure 3:
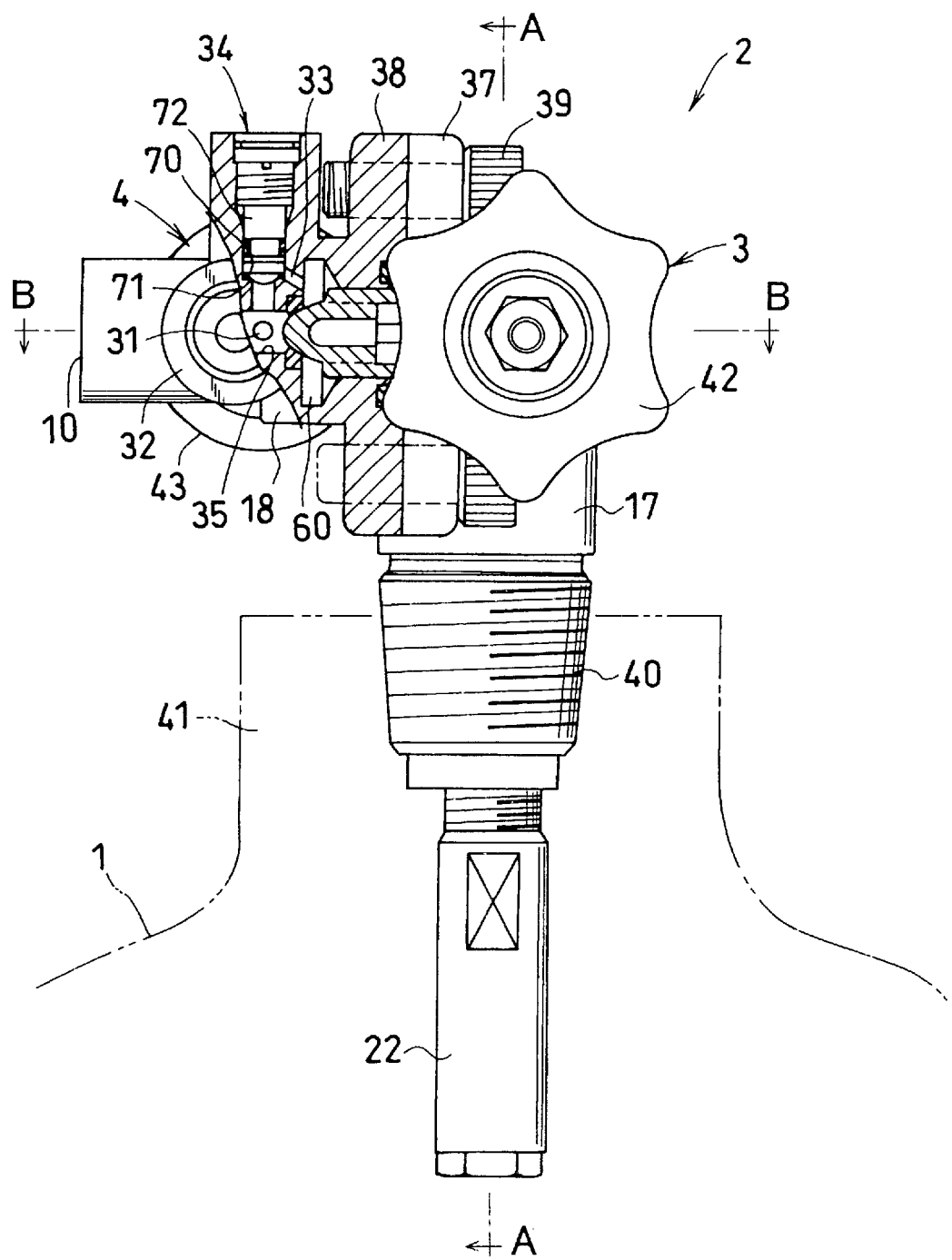
FIG. 3 is a front view, partly broken, of the valve assembly of the first embodiment.
Figure 4:
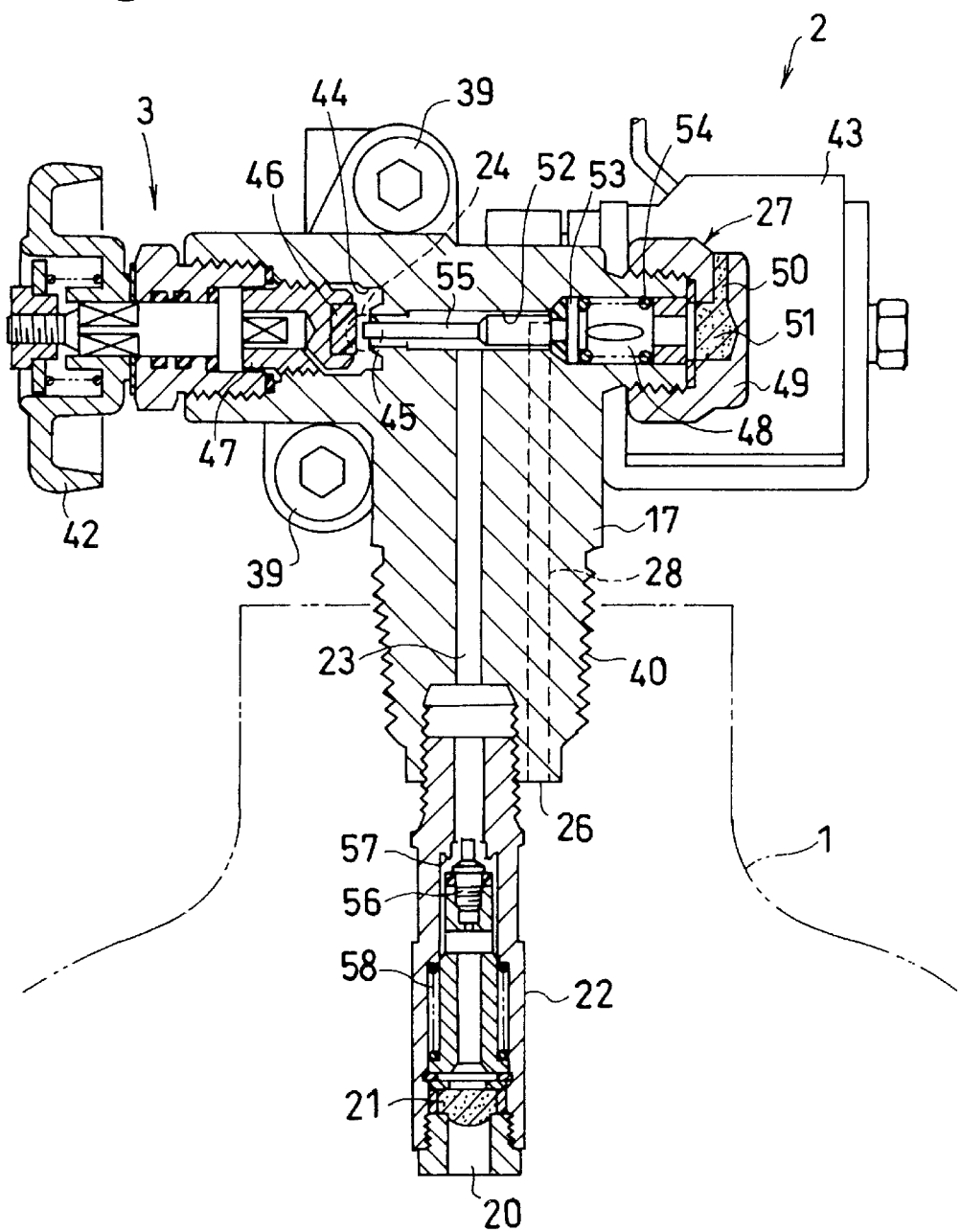
FIG. 4 is a sectional view when seen along a line A—A in FIG. 3 in a direction indicated by arrows.
Figure 5:
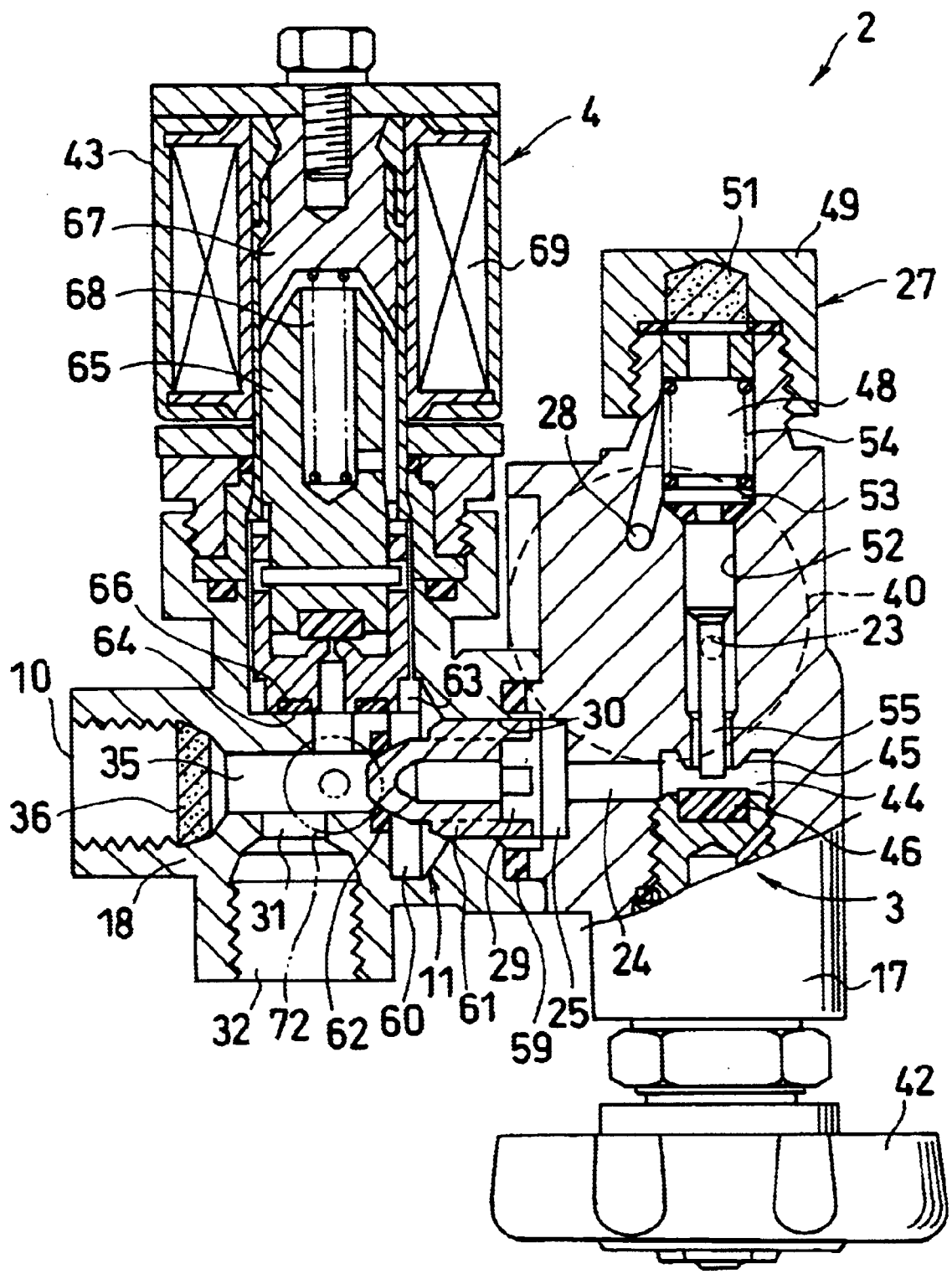
FIG. 5 is a sectional view when seen along a line B—B in FIG. 3 in a direction indicated by arrows.

Next, a concrete structure of the valve assembly is explained based on FIGS. 3 to 5 with reference to FIG. 2.

As shown in FIG. 3, the valve assembly 2 comprises the first housing 17 with a flange portion 37 and the second housing 18 with a flange portion 38. The flange portion 37 and the flange portion 38 are mutually opposed and assuredly fixed to each other by a tightening bolt 39 of a fixing means.

In the case where some abnormality occurs in the main stop valve 4 provided in the second housing 18, the first housing 17 is easily separated from the second housing 18 through loosening the tightening bolt 39. After the abnormal part has been repaired or replaced by a normal one, the second housing 18 without any abnormality is surely fixed to the first housing 17 by the tightening bolt 39.

The first housing 17 has a threaded leg portion 40 fixed to a neck portion 41 of the gas cylinder 1 in screw-thread engagement. The threaded leg portion 40 has an under surface fixed to the excess flow check valve 22 in screw-thread engagement. The first housing 17 has an upper front surface from which a handle 42 projects. The handle 42 is an actuation means which actuates the cylinder main valve 3 to open and close.

The second housing 18 has a front surface portion, a left side portion and an upper portion provided with the gas outlet 32, the gas charging port 10, and the third opening and closing valve 34, respectively. The second housing 18 also has a rear portion to which an electromagnetic device 43 for the main stop valve 4 is attached.

In this embodiment, for convenience, explanation is given with FIG. 3 taken as a front view. But there are many cases where the valve assembly of the present invention is attached to a gas cylinder, for example, as laid horizontally. In consequence, the vertical, left and right, front and rear directions of the valve assembly according to the present invention are not limited to those explained in this embodiment and other ones to be mentioned later.

As shown in FIG. 4, the excess flow check valve 22 has a lower end formed with the gas inlet 20. The gas inlet 20 has an inner portion to which the filter 21 is attached. The gas inlet 20 communicates with a first valve chamber 44 of the cylinder main valve 3 through the gas inlet passage 23 within the first housing 17. The first valve chamber 44 communicates with the communication outlet 25 through the first communication passage 24.

As shown in FIGS. 4 and 5, the first valve chamber 44 has an inlet provided with a first valve seat 45. Further, a first closure member 46 is inserted into the first valve chamber 44 and is interlockingly connected to the handle 42 through a spindle 47 of the transmission member. The first closure member 46 is actuated to open and close with respect to the first valve seat 45 by manually operating the handle 42.

The threaded leg portion 40 has an under surface opened to provide the gas lead-out outlet 26, which communicates with a safety valve chamber 48 of the safety valve 27 through the gas lead-out passage 28 arranged in parallel with the gas inlet passage 23.

The safety valve chamber 48 is closed by a cap 49. The cap 49 is provided with a discharge hole 50 into which a fusible alloy 51 having a low melting point is embedded. If the gas cylinder 1 is heated due to fire or the like, the fusible alloy 51 melts and is pushed out with the gas pressure within the gas cylinder 1 to result in opening the discharge hole 50. This discharges out the gas of excessively increased pressure within the gas cylinder 1 to avoid the rupture and the like of the gas cylinder.

The safety valve chamber 48 is arranged substantially in alignment with the first valve chamber 44. A return gas guide passage 52 is formed between the safety valve chamber 48 and the gas inlet passage 23. A return gas shut-off member 53 is inserted into the safety valve chamber 48, and it is pushed and urged toward the return gas guide passage 52 by a shut-off spring 54. The return gas shut-off member 53 has a front end from which a push rod 55 projects. The push rod 55 has a leading end which faces the first closure member 46 of the cylinder main valve 3.

In a state where the handle 42 is operated to open the closure member 46, the push rod 55 has its leading end projected into the first valve chamber 44. The return gas shut-off member 53 is pushed by the shut-off spring 54 and is brought into contact with an inlet of the return gas guide passage 52. This shuts off the communication between the safety valve chamber 48 and the return gas guide passage 52.

On the other hand, when the handle 42 is operated to close the first closure member 46, the push rod 55 has its leading end pushed by the first closure member 46. The return gas shut-off member 53 retreats against a resilient force of the shut-off spring 54 and separates from the inlet of the return gas guide passage 52. This communicates the safety valve chamber 48 with the return gas guide passage 52.

The excess flow check valve 22 has an interior area provided with a excess flow check member 56 which is arranged opposite to an excess flow check valve seat 57 and is urged in a valve-opening direction by a return spring 58.

When the fuel supply passage 5 has its piping or the like broken and as a result a large amount of gas tries to flow out of the gas cylinder 1, it increases a differential pressure between the gas inlet 20 and an outlet side of the excess flow check valve 22. The thus increased differential pressure moves the excess flow check member 56 toward the excess flow check valve seat 57 against a resilient force of the return spring 58 to close the valve. This shuts off the gas flow-out from the gas cylinder 1.

If the cylinder main valve 3 closes in this state, as mentioned above, the return gas shut-off member 53 retreats to result in communicating the interior space 19 of the gas cylinder 1 with the gas inlet passage 23 via the gas lead-out passage 28, the safety valve chamber 48 and the return gas guide passage 52 in the mentioned order. This removes the differential pressure between the gas inlet 20 and the outlet side of the excess flow check valve 22. The excess flow check member 56 returns to the opening condition by the resilient force of the return spring 58. Then after the gas leakage and the like have been repaired, the cylinder main valve 3 is opened, thereby enabling the fuel gas to be normally taken out of the gas cylinder 1.

As shown in FIG. 5, the first housing 17 is fixed to the second housing 18. The first communication passage 24 has the communication outlet 25 communicated with the communication inlet 29 of the second communication passage 30 while directly opposing to each other.

In this embodiment, the flow passages within the first housing 17 are connected to those within the second housing 18 only at one portion between the communication outlet 25 and the communication inlet 29. Therefore, it is possible to readily seal the flow passages within the housing 16 through a sealing member 59 arranged around the connected portion by fastening the tightening bolt 39.

The second communication passage 30 communicates with a check valve chamber 60 of the check valve 11. A check member 61 is inserted into the check valve chamber 60.

The check valve chamber 60 communicates with the gas outlet passage 31 through a second valve chamber 63 of the main stop valve 4. The second valve chamber 63 has an outlet formed with a second valve seat 64. In consequence, the communication inlet 29 communicates with the gas outlet 32 through the second communication passage 30, the check valve chamber 60, the second valve chamber 63, the second valve seat 64 and the gas outlet passage 31 in the mentioned order within the second housing 18.

Inserted into the second valve chamber 63 is a second closure member 66 attached to a leading end of a plunger 65. A valve closing spring 68 is arranged between the plunger 65 and a fixed core 67 of the electromagnetic device 43. The valve closing spring 68 exerts a resilient force which pushes the second closure member 66 to the second valve seat 64 through the plunger 65. On the other hand, when the electromagnetic device 43 has a solenoid coil 69 energized to be exited, the plunger 65 is attracted to the fixed core 67 against the resilient force of the valve closing spring 68. This separates the second closure member 66 from the second valve seat 64 to open the valve.

Within the second housing 18, the gas charging passage 35 is formed perpendicular to the gas outlet passage 31. The check valve chamber 60 communicates with the gas charging port 10 through the gas charging passage 35. The gas charging port 10 has an inner portion to which the second filter 36 is attached. Further, a check valve seat 62 is formed at an inlet from the gas charging passage 35 to the check valve chamber 60.

When taking gas out of the gas cylinder 1, the check member 61 is pushed to the check valve seat 62 with the pressure of the gas which flows into the second communication passage 30, to thereby shut off the communication between the check valve chamber 60 and the gas charging passage 35. On the other hand, when charging gas, the check member 61 is pushed with the pressure of the charged gas and is separated from the check valve seat 62. At the gas charging time, the engine switch 9 is put off, and the main stop valve 4 is closed as well as the fuel shut-off valve 6 (see FIG. 2). Thus the charged gas is not supplied to the fuel supply passage side and is charged from the check valve chamber 60 into the gas cylinder 1, through the second communication passage 30, the first communication passage 24, the first valve chamber 44 of the cylinder main valve 3, the gas inlet passage 23 and the gas inlet 20 in the mentioned order.

As shown in FIG. 3, the check valve chamber 60 communicates with a portion at which the gas outlet passage 31 crosses the gas charging passage 35, through the bypass passage 33. The bypass passage 33 has a mid portion provided with a third valve chamber 70 of the third opening and closing valve 34. The third valve chamber 70 has an outlet formed with a third valve seat 71. A third closure member 72 is inserted into the third valve chamber 70. When manually advancing and retracting the third closure member 72 with respect to the third valve seat 71, the third opening and closing valve 34 is opened and closed.

During the normal gas take-out and charging, the third opening and closing valve 34 is closed. However, after the pipes have been arranged, in the case where the airtightness and the gas conductivity of the pipes are inspected with the engine switch 9 put off, the inspection is effected by opening the third opening and closing valve 34.

(Second Embodiment)

FIGS. 6 to 9 show a second embodiment of the present invention. This second embodiment is explained by, in principle, attaching the same characters to the same constituent members as those of the first embodiment.

Figure 6:
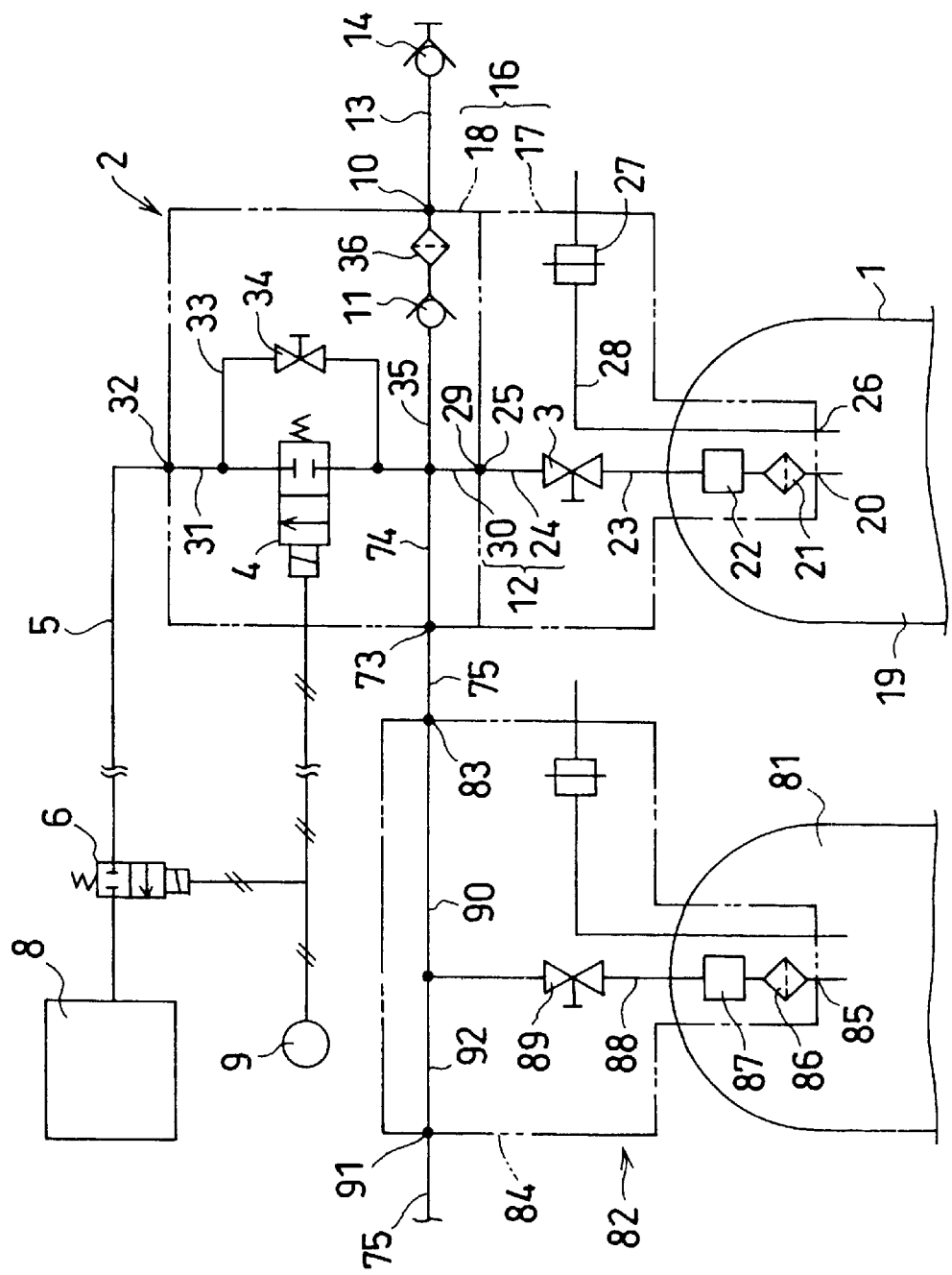
FIG. 6 shows a second embodiment of the present invention and is a system view of another valve assembly.

As shown in FIG. 6, the valve assembly 2 of the second embodiment comprises the first housing 17 and the second housing 18 removably connected to each other as well as in the first embodiment. The first housing 17 has the communication outlet 25 communicated with and connected to the communication inlet 29 of the second housing 18 while directly opposing to each other.

Further, like the first embodiment, within the first housing 17, the gas inlet 20 communicates with the communication outlet 25 through the first filter 21, the excess flow check valve 22, the gas inlet passage 23, the cylinder main valve 3 and the first communication passage 24. In addition, the gas lead-out outlet 26, the gas lead-out passage 28 and the safety valve 27 are provided likewise.

Moreover, also within the second housing 18, the communication inlet 29 communicates with the gas outlet 32 through the main stop valve 4 and the gas outlet passage 31, and the third opening and closing valve 34 is provided at a mid portion of the bypass passage 33 arranged in parallel with the main stop valve 4 like the first embodiment. The second housing 18 has an outer surface formed with the gas charging port 10, which is connected to the second communication passage 30 by the gas charging passage 35. The gas charging passage 35 is provided with the check valve 11 which inhibits the gas flow from the interior space 19 of the gas cylinder 1 to the gas charging port 10. On these points, the second embodiment is the same as the first embodiment. However, the first embodiment crosses the gas charging passage 35 with the gas outlet passage 31, while the second embodiment provides the gas charging passage 35 at a position different from a position where the gas outlet passage 31 is provided. On this point, the second embodiment is distinct from the first embodiment.

In the second embodiment, the second housing 18 has the outer surface formed with a gas cylinder connection port 73. A gas branching passage 74 is disposed so as to communicate the gas cylinder connection port 73 with the second communication passage 30 within the second housing 18.

The gas cylinder connection port 73 is connected to a gas outlet 83 of another valve assembly 82 attached to another gas cylinder 81 through a gas communication pipe 75. However, if the another gas cylinder 81 is not needed, the gas cylinder connection port 73 is closed by a sealing plug.

The another valve assembly 82 comprises a housing 84 within which a gas inlet 85 communicates with the gas outlet 83 through a filter 86, an excess flow check valve 87, a gas inlet passage 88, a cylinder main valve 89 and a gas outlet passage 90 in the mentioned order. Besides, the housing 84 has an outer surface provided with a gas cylinder connection port 91. There is provided within the housing 84 a gas branching passage 92 which communicates the gas cylinder connection port 91 with the gas outlet passage 90. The gas cylinder connection port 91 can be connected to still another gas cylinder through the gas communication pipe 75.

Gas within the another gas cylinder 81 is supplied to the engine 8 through the gas inlet 85 of another valve assembly 82, the gas inlet passage 88, the cylinder main valve 89, the gas outlet passage 90, the gas communication pipe 75, the gas cylinder connection port 73 of the valve assembly 2 according to the present intention, the gas branching passage 74, the second communication passage 30, the main stop valve 4, the gas outlet passage 31, the gas outlet 32 and the fuel supply passage 5 in the mentioned order by opening the cylinder main valve 89 and the main stop valve 4 of the valve assembly 2 according to the present invention.

When charging gas into the another gas cylinder 81, the gas is charged into the gas cylinder 81 through the gas charging pipe 13, the gas charging port 10 of the valve assembly 2 according to the present invention, the second filter 36, the gas charging passage 35, the check valve 11, the gas branching passage 74, the gas cylinder connection port 73, the gas communication pipe 75, the gas outlet passage 90 of the another valve assembly 81, the cylinder main valve 89, the gas inlet passage 88, the excess flow check valve 87, the filter 86 and the gas inlet 85 by opening the cylinder main valve 89 of the another valve assembly 82.

Figure 7:
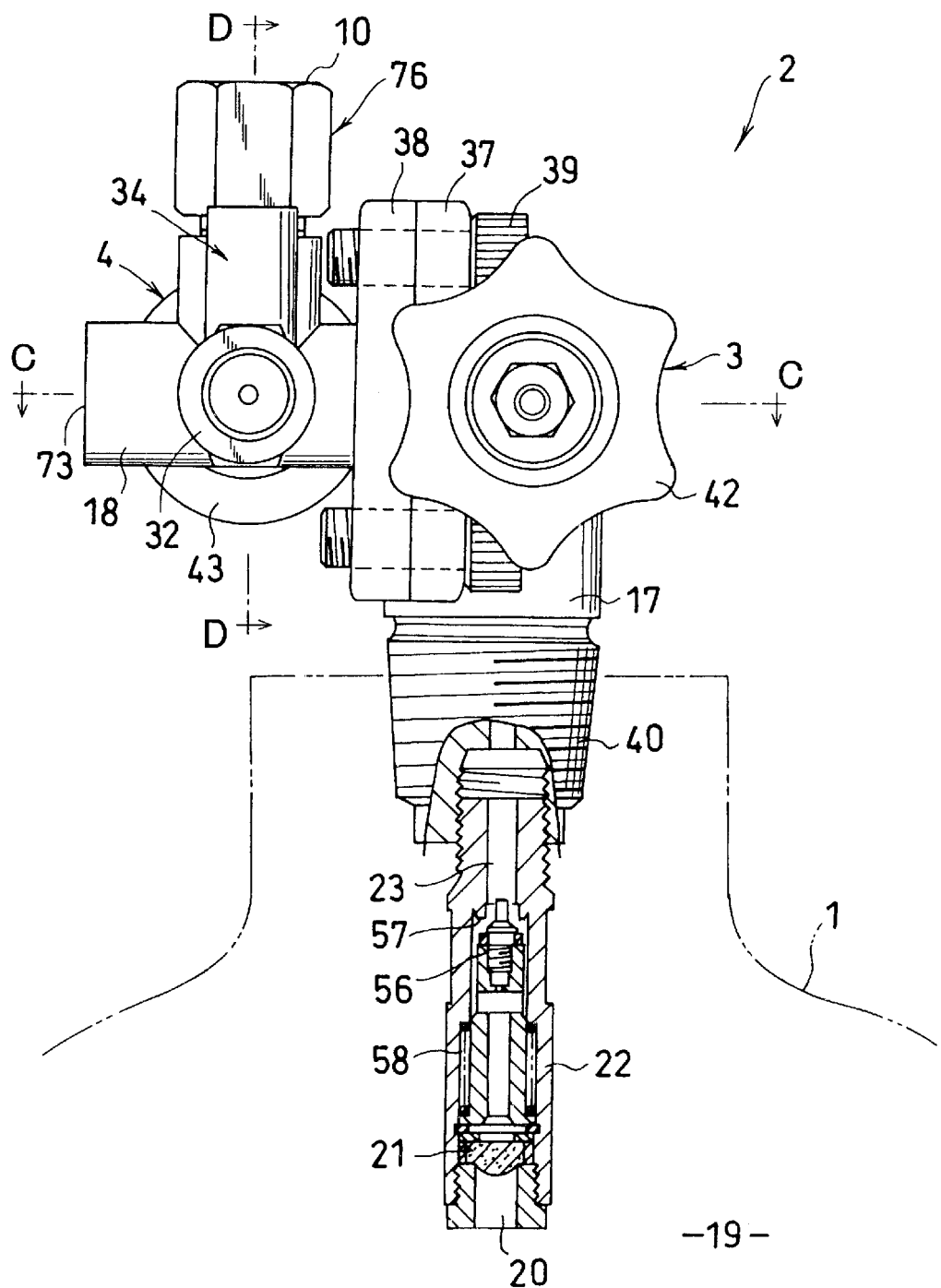
FIG. 7 is a front view, partly broken, of the another valve assembly of the second embodiment.
Figure 8:
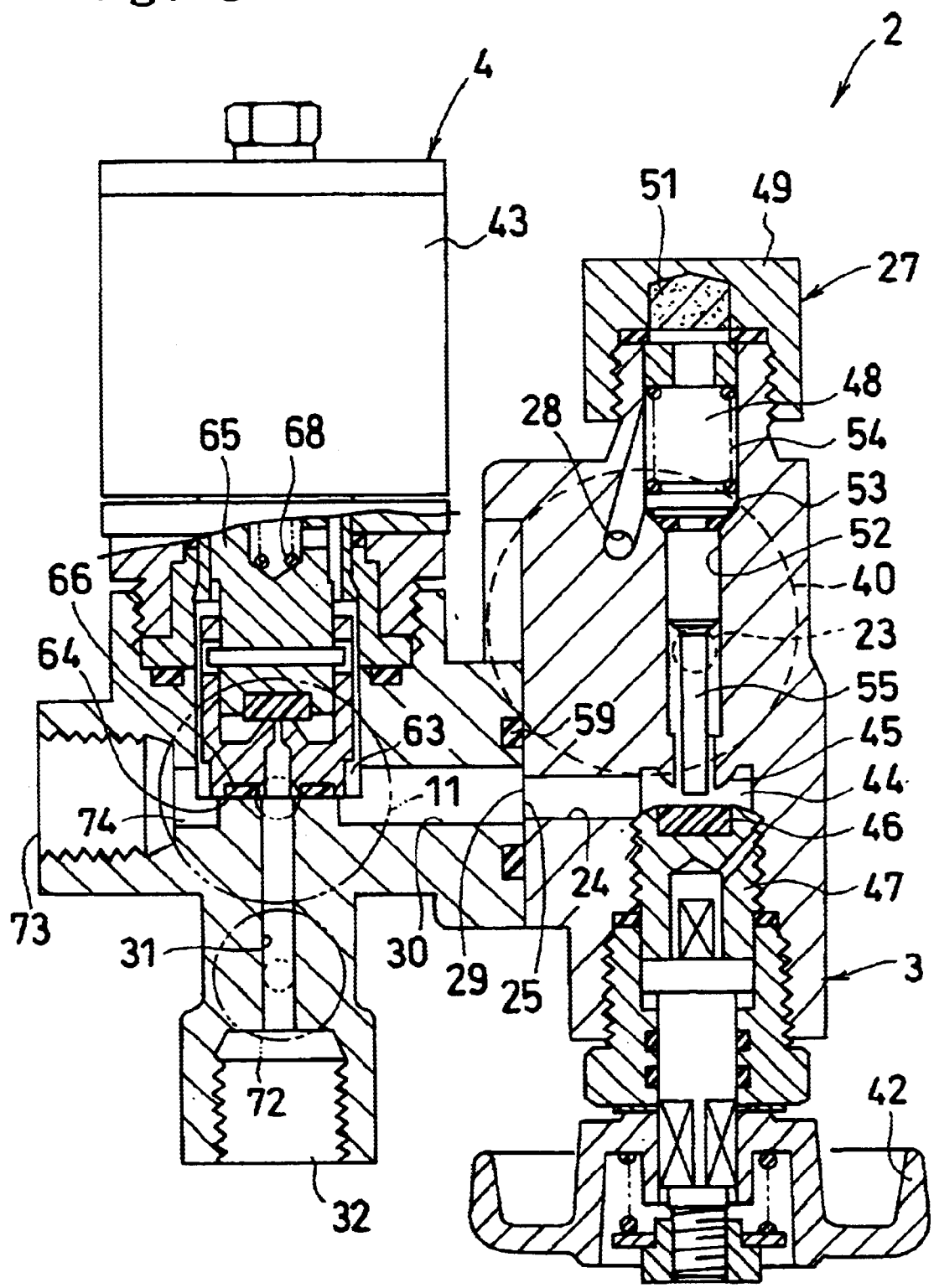
FIG. 8 is a sectional view when seen along a line C—C in FIG. 7 in a direction indicated by arrows.
Figure 9:
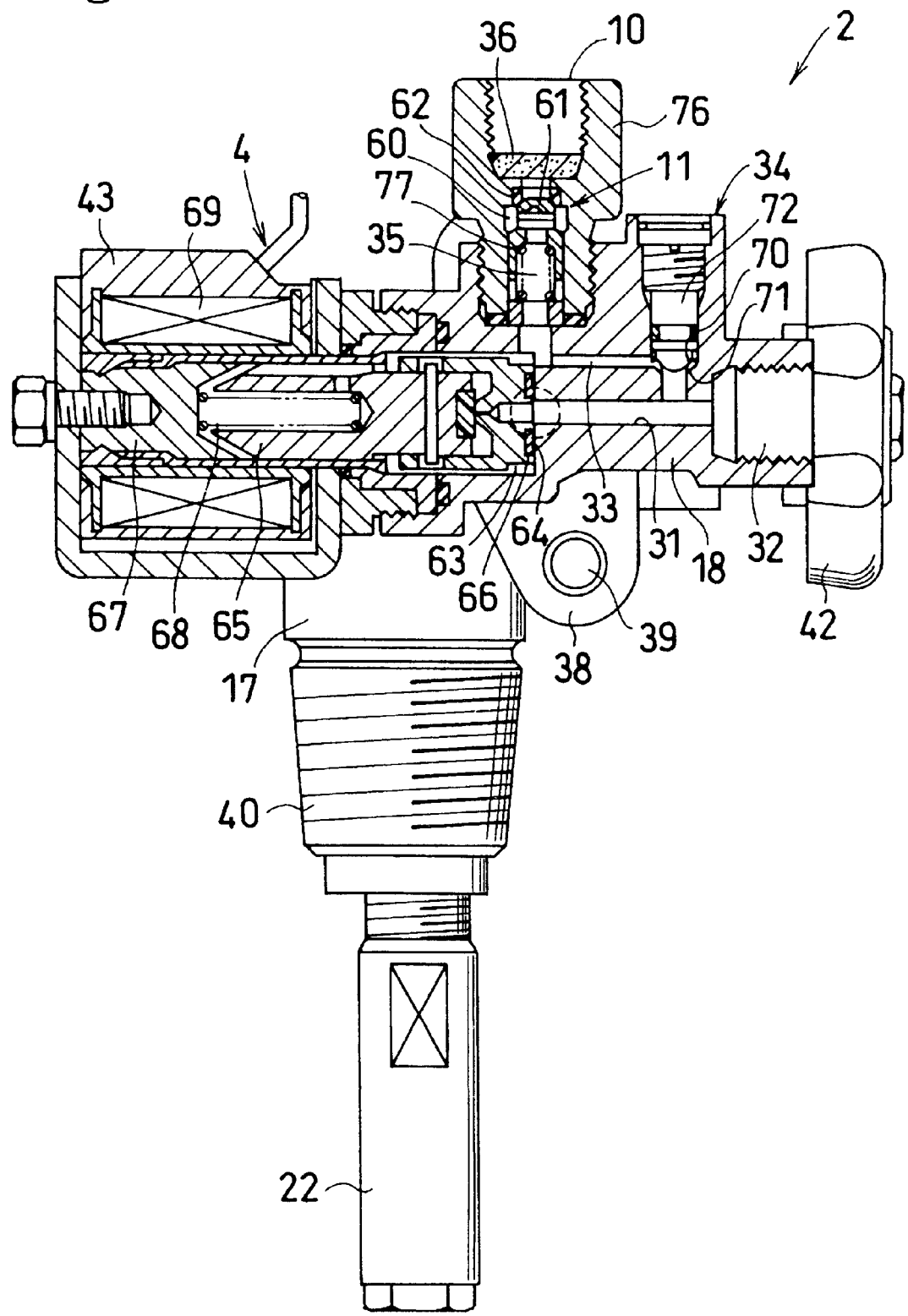
FIG. 9 is a sectional view when seen along a line D—D in FIG. 7 in a direction indicated by arrows.

Next, a concrete structure of the valve assembly according to this second embodiment is explained based on FIGS. 7 to 9 with reference to FIG. 6

As shown in FIG. 7, like the first embodiment, this valve assembly also comprises the first housing 17 with the flange portion 37 and the second housing 18 with the flange portion 38. The flange portion 37 and the flange portion 38 are secured assuredly to each other by the tightening bolt 39.

The first housing 17 has the same structure as that of the first embodiment and accordingly explanation therefor is omitted here.

The second housing 18 has a front surface portion, a left side portion and an upper portion provided with the gas outlet 32, the gas cylinder connection port 73 and the gas charging port 10, respectively. The third opening and closing valve 34 is arranged ahead of the gas charging port 10. The second housing 18 has a rear portion to which the electromagnetic device 43 for the main stop valve 4 is attached.

As shown in FIG. 8, the second communication passage 30 communicates the communication inlet 29 with the second valve chamber 63 of the main stop valve 4. This second valve chamber 63 communicates with the gas outlet 32 through the gas outlet passage 31. The main stop valve 4 has the same structure as that of the first embodiment and accordingly explanation therefor is omitted.

Gas within the gas cylinder 1 is supplied to the engine 8 through the gas inlet 20, the gas inlet passage 23, the first valve chamber 44, the first communication passage 24, the second communication passage 30, the second valve chamber 63, the gas outlet passage 31 and the gas outlet 32 in the mentioned order by opening the cylinder main valve 3 and the main stop valve 4, like the first embodiment.

The second valve chamber 63 communicates with the gas branching passage 74 on a side opposite to the second communication passage 30. The gas cylinder connection port 73 communicates with the second communication passage 30 through the gas branching passage 74 and the second valve chamber 63.

As shown in FIG. 9, the second valve chamber 63 has an upper portion to which a check valve unit 76 is attached in screw-thread engagement. The check valve unit 76 has an upper end formed with the gas charging port 10 and has an interior area provided with the gas charging passage 35, through which the gas charging port 10 communicates with the second valve chamber 63.

The gas charging passage 35 has a mid portion formed with the check valve chamber 60, into which the check member 61 is inserted. The check valve chamber 60 has an inlet formed with the check valve seat 62, to which the check member 61 is urged by a check spring 77.

When charging gas, the check member 61 moves for valve opening against a resilient force of the check spring 77 with the pressure of the charged gas. The flowed-in gas is charged from the gas charging passage 35 into the gas cylinder 1 through the second valve chamber 63, the second communication passage 30, the first communication passage 24, the first valve chamber 44 of the cylinder main valve 3, the gas inlet passage 23 and the gas inlet 20 in the mentioned order.

The gas outlet passage 31 has an upper side on which the bypass passage 33 is arranged in parallel therewith. The second valve chamber 63 communicates with a mid portion of the gas outlet passage 31 through the bypass passage 33. The bypass passage 33 has a mid portion to which the third opening and closing valve 34 is attached. The third opening and closing valve 34 is manually operated so as to control the communication and the shut-off of the bypass passage 33.

(Third Embodiment)

Figure 10:
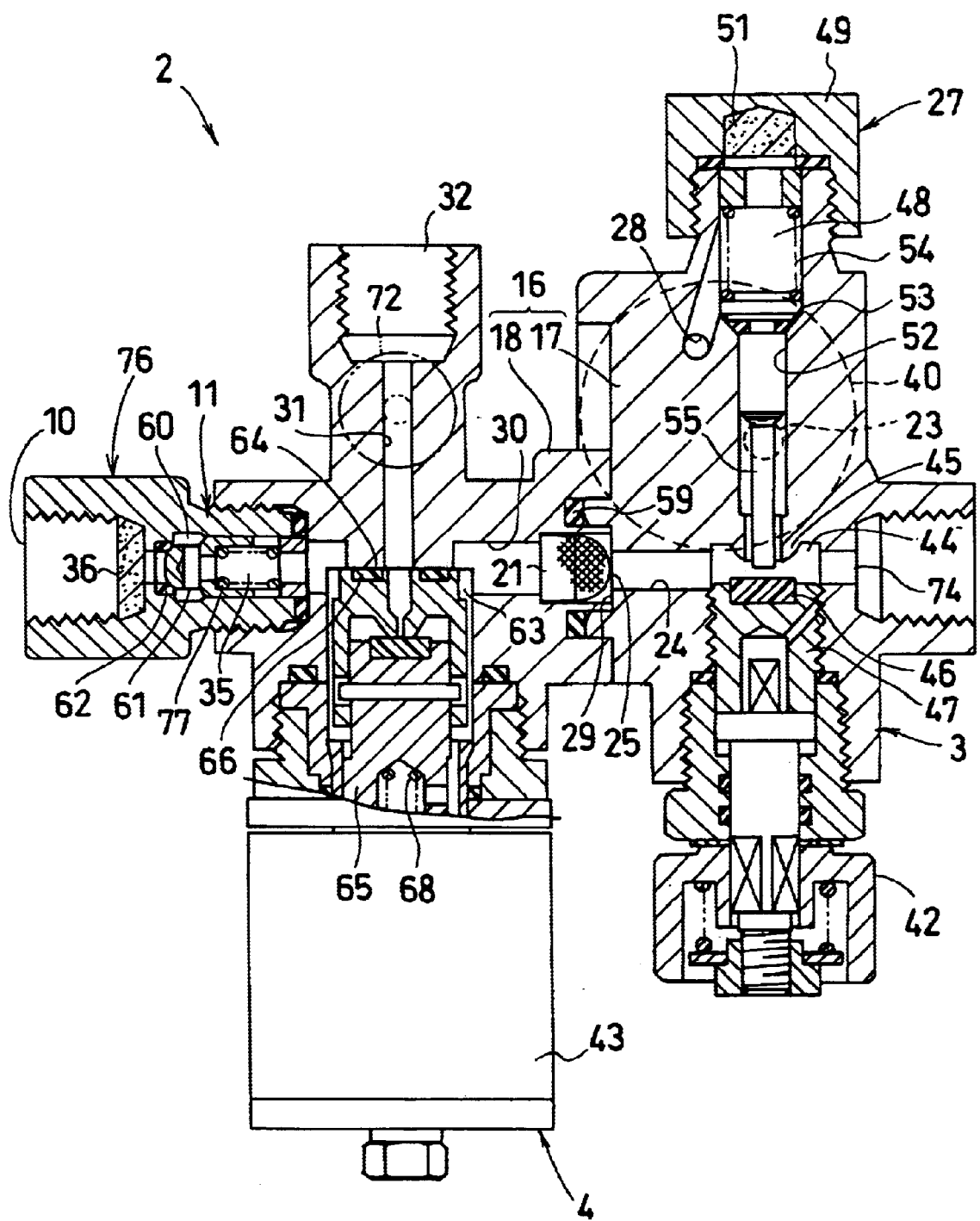
FIG. 10 shows a third embodiment of the present invention and corresponds to FIG. 5.

FIG. 10 shows a third embodiment. This third embodiment is explained by, in principle, attaching the same characters to the same constituent members as those of the first and the second embodiments.

In this third embodiment, the first housing 17 has an outer surface formed with the gas cylinder connection port 73. Provided within the first housing 17 is the gas branching passage 74 which communicates the gas cylinder connection port 73 with the first valve chamber 44. In consequence, the gas cylinder connection port 73 is provided in parallel with the main stop valve 4. A gas connection pipe (not shown) can be connected to the gas cylinder connection port 73. Like the second embodiment, the gas outlet passage 31 and the gas charging passage 35 within the valve assemble 2 can be connected to another gas cylinder through this gas connection pipe.

The first housing 17 is provided with the safety valve 27 like the first embodiment. The second housing 18 is fixed to the first housing 17. However, the electromagnetic device 43 provided in the second housing 18 is arranged remote from the safety valve 27 unlike the first embodiment.

Further, the first filter 21 is provided in the vicinity of the communication inlet 29 of the second housing 18 unlike the first embodiment. The first filter 21 prevents the foreign matters contained in the gas taken out of the gas cylinder from flowing into the main stop valve 4. This first filter 21 can be easily replaced by removing the second housing 18 from the first housing 17.

The second housing 18 has the same check valve unit 76 as that of the second embodiment, which is attached thereto in screw-thread engagement. This check valve unit 76 has an external end formed with the gas charging port 10 and has an interior area provided with the gas charging passage 35. The gas charging port 10 communicates with the second valve chamber 63 of the main stop valve 4 through the gas charging passage 35. The gas charging passage 35 has a mid portion at which the check valve 11 is arranged.

The other construction is the same as that of the first embodiment and accordingly explanation therefor is omitted.

(Fourth Embodiment)

Figure 11:
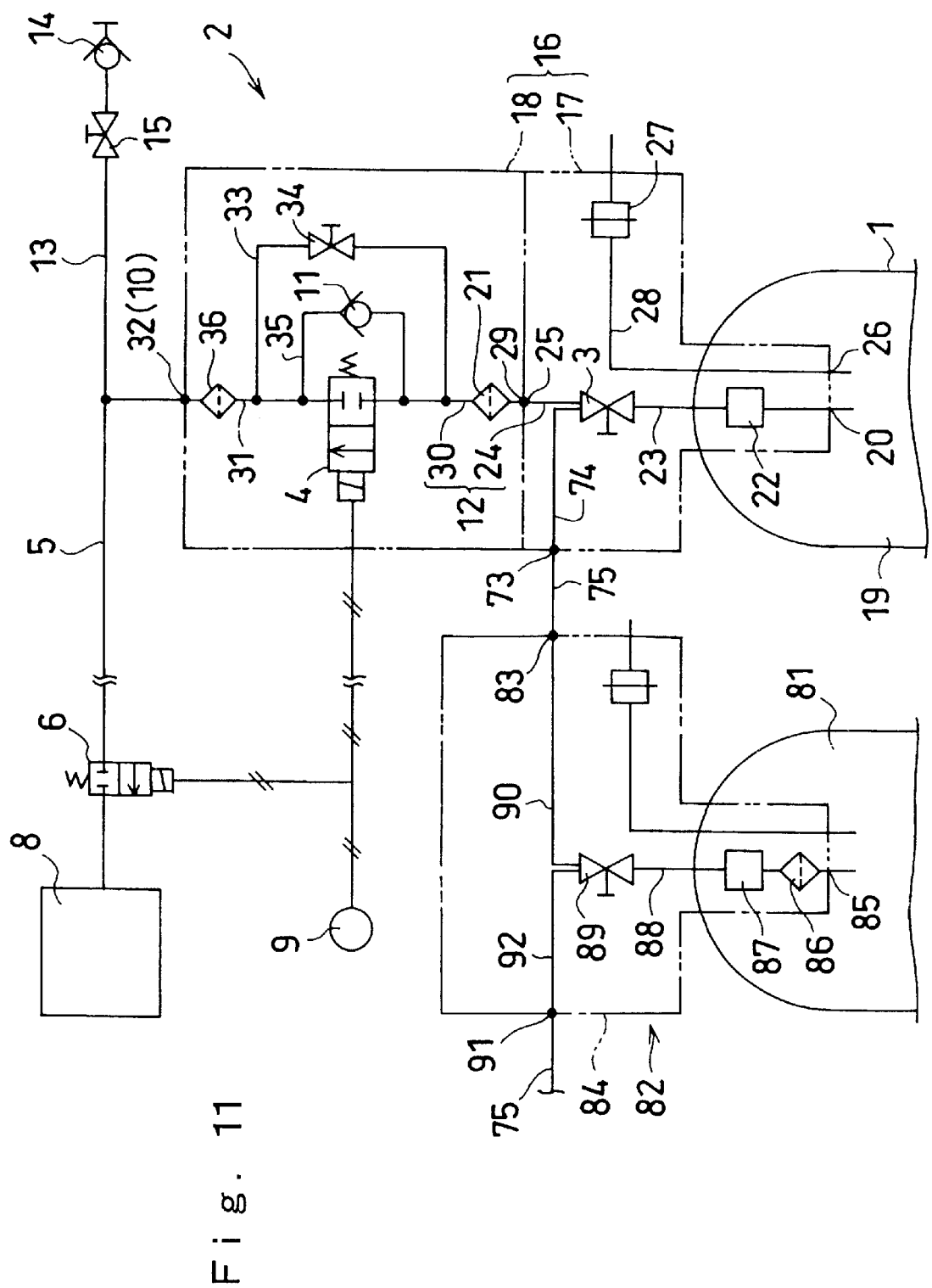
FIG. 11 shows a fourth embodiment of the present invention and is a system view of still another valve assembly.
Figure 12:
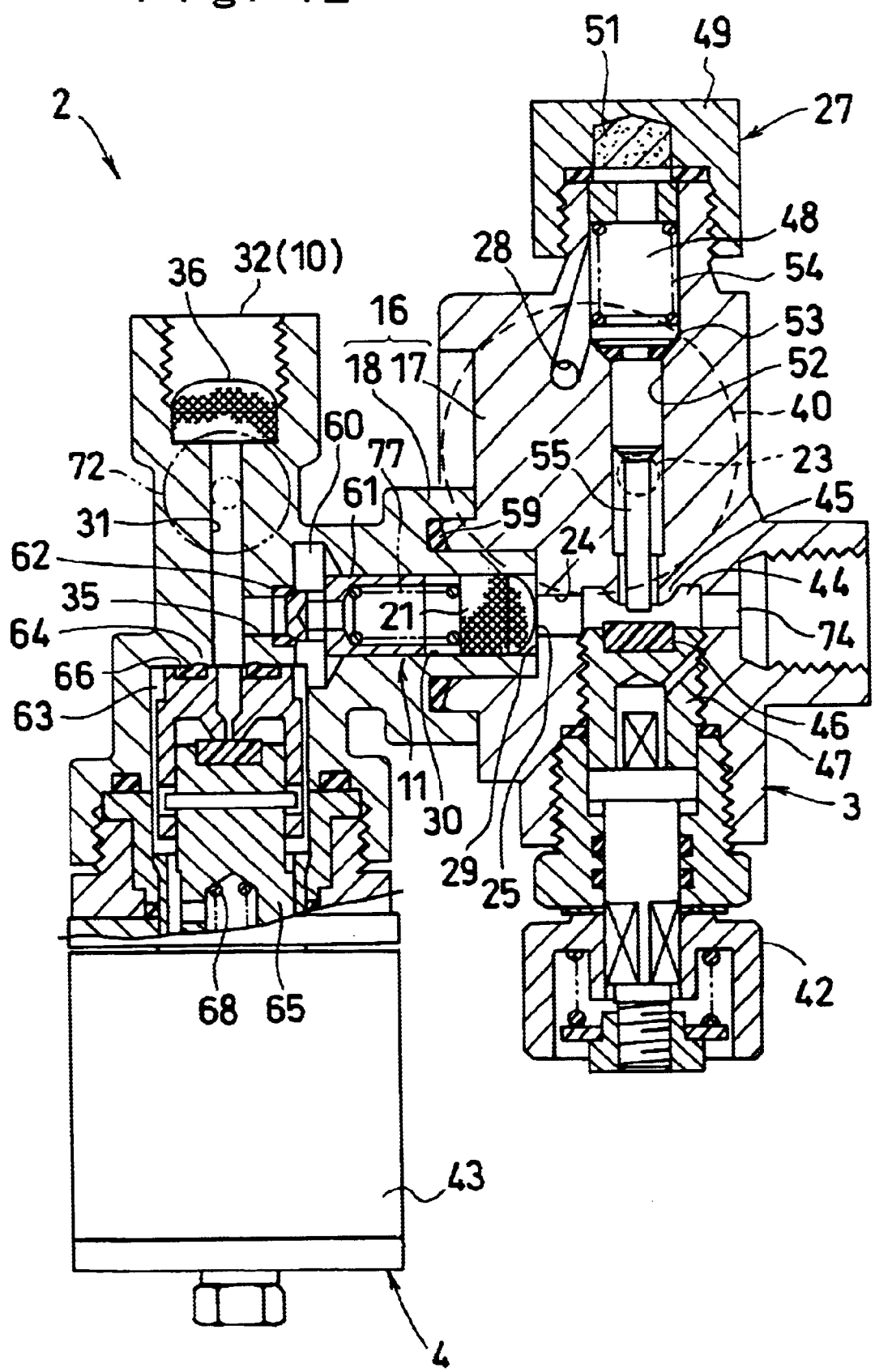
FIG. 12 shows the fourth embodiment of the present invention and corresponds to FIG. 5.

FIGS. 11 and 12 show a fourth embodiment. This fourth embodiment is explained by, in principle, attaching the same characters to the same constituent members as those of the first to the third embodiments.

In this fourth embodiment, the gas outlet 32 also serves as the gas charging port 10 unlike the foregoing respective embodiments. The gas charging port 10 communicates with the interior space 19 of the gas cylinder 1 by the gas charging passage 35, which branches from the mid portion of the gas outlet passage 31. The gas charging passage 35 is provided with the check valve 11 like the first embodiment.

As shown in FIG. 11, the fuel supply passage 5 to the engine 8 and the gas charging pipe 13 are formed into one piping structure which has a mid portion connected to the gas outlet 32 also serving as the gas charging port 10.

When supplying the gas taken out of the gas cylinder 1 to the engine 8, the check valve 11 closes to result in preventing the taken-out gas from passing through the gas charging passage 35. After having passed through the main stop valve 4, it is guided to the engine 8 via the fuel supply passage 5. At this time, there is no likelihood that the gas is discharged out of the charging device connector 14 since the gas charging valve 15 provided in the gas charging pipe 13 is closed. On the other hand, during the gas charging from the connector 14, the charged gas is unlikely to be supplied to the engine 8 because a fuel shut-off valve 6 provided in the fuel supply passage 5 is closed.

The other construction is the same as that of the third embodiment and accordingly explanation therefor is omitted.

(Fifth Embodiment)

Figure 13:
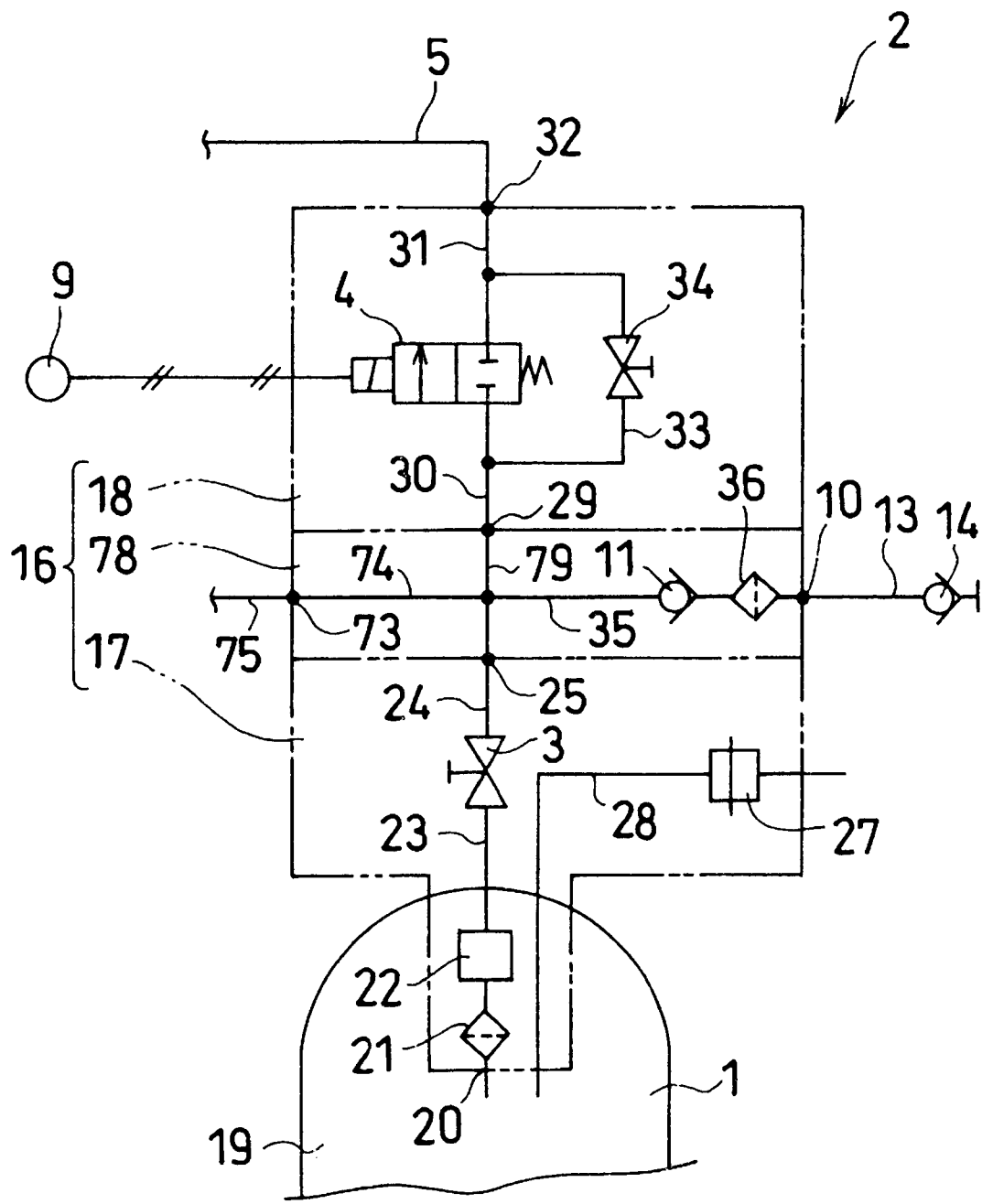
FIG. 13 shows a fifth embodiment and is a system view of still another valve assembly.

FIG. 13 shows a fifth embodiment of the present invention and is a system view of still another valve assembly.

In the first to the fourth embodiments, the first housing 17 and the second housing 18 are connected and fixed to each other by bringing the former into direct contact with the latter. In this fifth embodiment, a spacer block 78 is arranged between both of the housings 17 and 18.

The spacer block 78 has an interior area formed with a third communication passage 79, through which the first housing 17 has its communication outlet 25 communicated with the communication inlet 29 of the second housing 18.

The spacer block 78 has an outer surface provided with the gas charging port 10 and the gas cylinder connection port 73. The gas charging port 10 and the gas cylinder connection port 73 communicate with the third communication passage 79 through the gas charging passage 35 and the gas branching passage 74, respectively.

The other construction is the same as that of the second embodiment and accordingly explanation therefor is omitted.

According to the present invention, the gas charging port may be provided in an outer surface of the first housing. In this case, the gas charging port may be connected to the first communication passage through the gas charging passage. Alternatively, it may directly communicate with the gas inlet passage or with the interior area of the gas cylinder.

In the above-mentioned embodiments, explanation is given to the valve assembly which is used for a fuel gas cylinder of an engine employing compressed natural gas as a fuel. Needless to say, it may be utilized for other fuel gas cylinders or other cylinders which contain gasses other than the fuel gas.

What is claimed is:

1. A valve assembly comprising:

a housing (16) having a first housing (17) and a second housing (18), the first housing (17) being fixed to a gas cylinder (1) and provided with a gas inlet (20) which communicates with an interior space (19) of the gas cylinder (1), a gas inlet passage (23), a first opening and closing valve (3), a first communication passage (24), and a communication outlet (25);

the first opening and closing valve (3) having a first valve chamber (44) and a first valve seat (45);

a first closure member (46) inserted into the first valve chamber (44);

an actuation means (42) interlockingly connected to the first closure member (46) through a transmission member (47) and being manually operated to open and close the first closure member (46) with respect to the first valve seat (45);

the second housing (18) provided with a communication inlet (29), a second communication passage (30), a second opening and closing valve (4), a gas outlet passage (31), a gas outlet (32);

the second opening and closing valve (4) having a second valve chamber (63), a second valve seat (64), a valve closing spring (68) and an electromagnetic device (43);

a second closure member (66) inserted into the second valve chamber (63), the second closure member (66) being pushed toward the second valve seat (64) by a resilient force of the valve closing spring (68) and moved in a valve-opening direction when the electromagnetic device (43) is energized;

a fixing means (39) fixing the second housing (18) to the first housing (17), in this state where the second housing (18) is fixed to the first housing (17), the communication inlet (29) communicating with the communication outlet (25);

a gas charging port (10) provided in the housing (16);

a gas charging passage (35) arranged in parallel with the second opening and closing valve (4) and communicating the gas charging port (10) with the interior space (19) of the gas cylinder (1); and a check valve (11) provided in the gas charging passage (35) and inhibiting gas flow from the interior space (19) to the gas charging port (10).

2. The valve assembly as set forth in claim 1, wherein the fixing means (39) is a tightening bolt.

3. The valve assembly as set forth in claim 1 further comprising:

a safety valve (27) provided in the first housing (17) and having a safety valve chamber (48) and a discharge hole (50);

a gas lead-out passage (26) communicating the safety valve chamber (48) with the interior space (19) of the gas cylinder (1);

a fusible alloy (51) closing the discharge hole (50); and the second housing (18) fixed to the first housing (17) in a state where the electromagnetic device (43) is arranged at a portion remote from the safety valve (27).

4. The valve assembly as set forth in claim 1 further comprising:

a bypass passage (33) arranged in parallel with the second opening and closing valve (4) and communicating the second communication passage (30) with the gas outlet (32); and a third opening and closing valve (34) provided in the bypass passage (33) and manually opened and closed.

5. The valve assembly as set forth in claim 1 wherein the gas charging port (10) also serves as the gas outlet (32) and the gas charging passage (35) branches from a mid portion of the gas outlet passage (31).

6. The valve assembly as set forth in claim 1 further comprising:

a first filter (21) arranged between the gas inlet (20) and a second opening and closing valve (4), the interior space (19) of the gas cylinder (1) communicating with the second valve chamber (63) through the first filter (21); and a second filter (36) arranged between the gas charging port (10) and the check valve (11), the gas charging port (10) communicating with the interior space (19) of the gas cylinder (1) through the second filter (36).

7. A valve assembly comprising:

a housing (16) having a first housing (17) and a second housing (18), the first housing (17) being fixed to a gas cylinder (1) and provided with a gas inlet (20) which communicates with an interior space (19) of the gas cylinder (1), a gas inlet passage (23), a first opening and closing valve (3), a first communication passage (24), and a communication outlet (25);

the first opening and closing valve (3) having a first valve chamber (44) and a first valve seat (45);

a first closure member (46) inserted into the first valve chamber (44);

an actuation means (42) interlockingly connected to the first closure member (46) through a transmission member (47) and being manually operated to open and close the first closure member (46) with respect to the first valve seat (45);

the second housing (18) provided with a communication inlet (29), a second communication passage (30), a second opening and closing valve (4), a gas outlet passage (31), a gas outlet (32);

the second opening and closing valve (4) having a second valve chamber (63), a second valve seat (64), a valve closing spring (68) and an electromagnetic device (43);

a second closure member (66) inserted into the second valve chamber (63), the second closure member (66) being pushed toward the second valve seat (64) by a resilient force of the valve closing spring (68) and moved in a valve-opening direction when the electromagnetic device (43) is energized;

a fixing means (39) fixing the second housing (18) to the first housing (17), in this state where the second housing (18) is fixed to the first housing (17), the communication inlet (29) communicating with the communication outlet (25);

a gas cylinder connection port (73) provided in the housing (16); and a gas branching passage (74) arranged in parallel with the second opening and closing valve (4) and communicating an inter-space between the first valve seat (45) and the second valve seat (64) with the gas cylinder connection port (73).

8. A valve assembly comprising:

a housing (16) having a first housing (17) and a second housing (18), the first housing (17) being fixed to a gas cylinder (1) and provided with a gas inlet (20) which communicates with an interior space (19) of the gas cylinder (1), a gas inlet passage (23), a first opening and closing valve (3), a first communication passage (24), and a communication outlet (25);

the first opening and closing valve (3) having a first valve chamber (44) and a first valve seat (45);

a first closure member (46) inserted into the first valve chamber (44);

an actuation means (42) interlockingly connected to the first closure member (46) through a transmission member (47) and being manually operated to open and close the first closure member (46) with respect to the first valve seat (45);

the second housing (18) provided with a communication inlet (29), a second communication passage (30), a second opening and closing valve (4), a gas outlet passage (31), a gas outlet (32);

the second opening and closing valve (4) having a second valve chamber (63), a second valve seat (64), a valve closing spring (68) and an electromagnetic device (43);

a second closure member (66) inserted into the second valve chamber (63), the second closure member (66) being pushed toward the second valve seat (64) by a resilient force of the valve closing spring (68) and moved in a valve-opening direction when the electromagnetic device (43) is energized;

a fixing means (39) fixing the second housing (18) to the first housing (17), in this state where the second housing (18) is fixed to the first housing (17), the communication inlet (29) communicating with the communication outlet (25);

a gas cylinder connection port (73) provided in the first housing (17); and a gas branching passage (74) arranged in parallel with the second opening and closing valve (4) and communicating the gas cylinder connection port (73) with the first valve chamber (44).

* * * * *